United States Patent
Hurd, II

(10) Patent No.: US 6,222,535 B1
(45) Date of Patent: Apr. 24, 2001

(54) SYSTEM AND METHOD FOR FACILITATING ISSUE TRACKING

(75) Inventor: Donald M. Hurd, II, Allen, TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/177,547

(22) Filed: Oct. 22, 1998

Related U.S. Application Data

(60) Provisional application No. 60/063,004, filed on Oct. 23, 1997.

(51) Int. Cl.[7] .............................. G06F 3/14; G06F 17/60; G06F 15/16
(52) U.S. Cl. .......................... 345/331; 345/971; 345/329; 709/205; 705/8
(58) Field of Search ...................................... 345/331, 971, 345/329, 332, 330; 709/205, 204, 201; 705/8, 9

(56) References Cited

U.S. PATENT DOCUMENTS

| | | | |
|---|---|---|---|
| 5,495,412 | * | 2/1996 | Thiessen ........................ 345/331 X |
| 5,671,360 | * | 9/1997 | Hambrick et al. ...................... 705/9 |
| 5,793,365 | * | 8/1998 | Tang et al. ............................ 345/329 |
| 5,878,214 | * | 3/1999 | Gilliam et al. ........................ 709/204 |
| 5,893,074 | * | 4/1999 | Hughes et al. .......................... 705/8 |
| 5,960,173 | * | 9/1999 | Tang et al. ............................ 709/201 |

* cited by examiner

Primary Examiner—Raymond J. Bayerl
(74) Attorney, Agent, or Firm—Baker Botts L.L.P.

(57) ABSTRACT

A system and method for facilitating tracking of issues utilize a series of graphical user interfaces (GUIs). A first GUI has a first plurality of information accepting fields operable to accept information defining the issue from an originator of the issue. In response to entry of said information defining the issue, the information is sent to an assigned party. The assigned party then uses a second GUI including a second plurality of information accepting fields to enter information related to a proposed resolution of the issue. The information related to a proposed resolution of the issue is then forwarded back to the originator to make a determination of whether the proposed resolution is satisfactory.

24 Claims, 2 Drawing Sheets

US 6,222,535 B1

SYSTEM AND METHOD FOR FACILITATING ISSUE TRACKING

CROSS REFERENCE TO RELATED APPLICATIONS

This application claims the benefit of U.S. Provisional Application No. 60/063,004 filed on Oct. 23, 1997 now abandoned.

TECHNICAL FIELD OF THE INVENTION

This invention relates generally to the field of information processing and more particularly to a system and method for facilitating issue tracking.

BACKGROUND OF THE INVENTION

Meetings are an everyday occurrence in the business world. Technology has touched almost all aspects of how we communicate during these meetings, from video conferences to video presentations on notebook computers. However, despite the advances, the way that we deal with issues that are raised during meetings has not changed significantly.

Issues raised during a meeting are typically written down by interested parties on a notepad. Unless an issue is central to the progression of a project, however, it is often overlooked, forgotten, or lost. Even if the issue is important, if it is not immediately assigned to an individual and given a suspense date, it may not be pursued any further.

If issues are not clearly assigned to individuals, it is possible for issues to be intentionally worked on by two separate parties. This is called "rework," and results in an unnecessary expenditure of valuable work time. This may be more common in a larger project where there are many small issues that are critical to solving a much larger issue. A party may invest time to resolve an issue, not knowing that a different party had previously resolved that issue while working on a related issue. This may result in a waste of valuable work time.

With the plethora of issues that may be raised during a meeting, even if an issue is assigned to an individual, it may be difficult for managers to remember what issues were assigned and to whom they were assigned. Without some sort of reminder, the assigned parties may forget about their assigned issues. Therefore, a need has arisen for a new method and apparatus for issue tracking that overcomes the disadvantages and deficiencies of the prior art.

SUMMARY OF THE INVENTION

It is therefore an object of the invention to document issues and their proposed solutions to facilitate issue tracking and resolution.

It is a further object of the invention to eliminate rework on an issue.

It is another object of the invention to provide reminders of open issues to an originator, a responsible party, an assigned party, or any combination thereof.

It is still another object of the invention to provide an administrator with user-definable issue status reports.

A computer system for facilitating tracking of an issue is disclosed. The system comprises a plurality of servers; a plurality of clients; communications means interconnecting said servers and said clients to form a computer network; and issue tracking means stored within one of said servers. The issue tracking means comprises a first graphical user interface (GUI) displayed on a computer display the first GUI comprising a first plurality of information accepting fields operable to accept information defining the issue from an originator of the issue; means for notifying an assigned party in response to entry of said information defining the issue; a second GUI displayed on the computer display, said second GUI comprising a second plurality of information accepting fields operable to accept information related to a proposed resolution of the issue from the assigned party; and means for forwarding said information related to a proposed resolution of the issue to a first group of users of said computer system.

In another embodiment, a method for facilitating tracking of an issue in accordance with the invention comprises the following steps: (1) entering information defining an issue to be tracked into a plurality of information accepting field on a first graphical user interface (GUI); (2) notifying an assigned party in response to entry of said information defining the issue; (3) entering information related to a proposed resolution of the issue from the assigned party into a plurality of information accepting fields on a second GUI; and, (4) forwarding said information related to a proposed resolution of the issue to a first group of interested individuals.

In another embodiment, an issue tracking application is disclosed. The application comprises: a first graphical user interface (GUI) displayed on a computer display, said first GUI comprising a first plurality of information accepting fields operable to accept information defining the issue from an originator of the issue; means for notifying an assigned party in response to entry of said information defining the issue; a second GUI displayed on the computer display, said second GUI comprising a second plurality of information accepting fields operable to accept information related to a proposed resolution of the issue from the assigned party; and, means for forwarding said information related to a proposed resolution of the issue to a first group of users of said application.

Embodiments of the present invention provide a system and method for facilitating tracking of issues. The method and system of the present invention provide the technical advantage of a systematic way to capture various issues and track their progress. Another technical advantage is that the invention enable issues to be catalogued in a database for historical purposes. Another technical advantage is that the invention tracks issues and thus, facilitates their closure. Other technical advantages are apparent to one skilled in the art from the following figures, detailed description and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

The embodiments of the present invention and their technical advantages are best understood by referring to FIGS. 1–4 of the drawings. Throughout the figures, like numerals are used to refer to like parts of the invention.

In order to facilitate understanding the teachings of the embodiments of the present invention, it will be helpful to know the terminology used. In the context of the present invention, there is some basic information associated with each issue. Issue information may include, inter alia, a relative priority, originator information, suspense information, and, an issue description. The importance of a particular issue, as compared to other issues, is set as the relative priority for the issue. In one embodiment, 1 represents a high priority issue, 2 represents a medium priority issue, and 3 represents a low priority issue. The relative priority for an issue may be established by user entry. Other ways of entering a priority for an issue may also be used.

Originator information provides information regarding the initiation of an issue. For example, originator information includes an indication of the originator of the issue, i.e., the person who enters the issue into the system, or who causes the issue to be entered. The identification of the user may be that user's e-mail address, employee number, network userid, or any other identification means. In a embodiment, the entering user's userid is automatically entered by the system. Originator information may also include, inter alia, an indication of the entering user's group and information regarding where the issue originated (e.g., at the July 2 meeting), etc.

Suspense information provides an indication of the time frame in which an issue is to be resolved. Suspense information may be indicated using any information which conveys a time frame. In one embodiment, the suspense information is a calendar date by which an issue must be resolved, i.e., a suspense date. In another embodiment, suspense information is a time period within which an issue must be resolved, i.e., a suspense time (e.g., 48 hours). In one embodiment, suspense information is optional.

An issue description provides an indication of what the issue is about. In one embodiment, an issue description is entered in a free-form text field. The description may be entered manually using, for example, a keyboard, or a description may be "cut and pasted" into this field. In an alternate embodiment, codes may be used to enter a issue description. In another alternate embodiment, a hypertext link to a world wide web (www) page may be used to link a user to an issue description. Other means of entering the description of the issue may also be used.

According to one embodiment of the present information, all of the above described issue information may be updated. For example, the relative priority of an issue may be changed from high to low if subsequent events render the issue unimportant.

Figure 1:
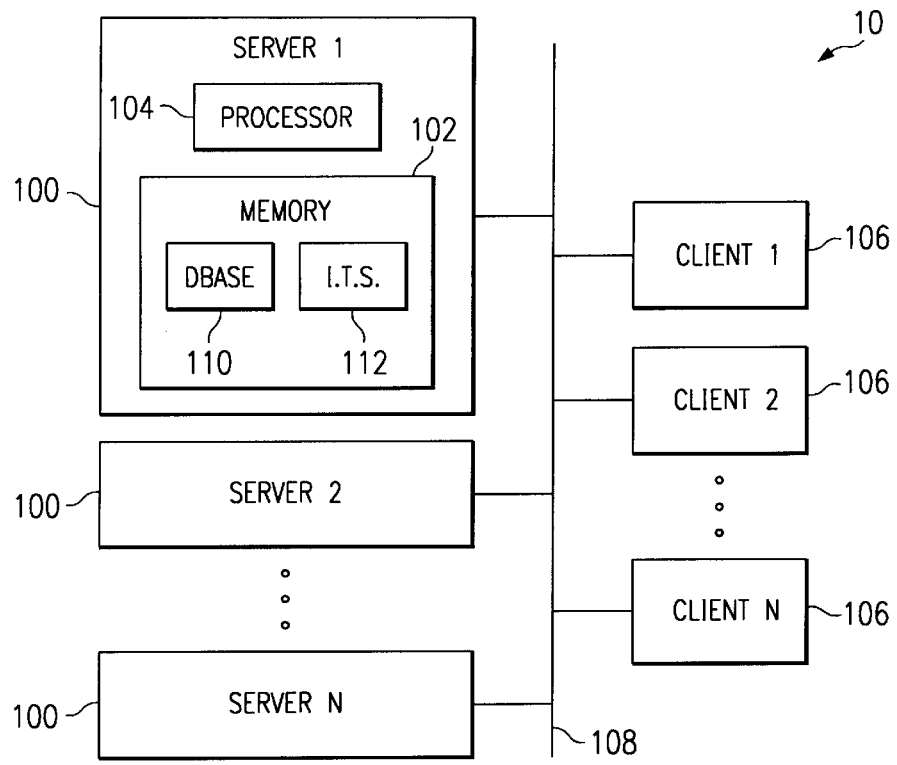
FIG. 1 illustrates an issue tracking system according to one embodiment of the invention.

The method and system for issue tracking according to embodiments of the present invention typically operate within a computer system. For example, FIG. 1, schematically depicts a computer system 10 within which a method and system according to embodiments of the invention operate. System 10 comprises n servers 100 and m clients 106 operatively interconnected by communications means 108. Servers 100 may be any computer and typically include, inter alia, memory 102 and processor 104. Memory 102 comprises any storage device suitable for holding large amounts of data, e.g., RAM. Processor 104 comprises any processor suitable for processing and managing data flow within system 10. Examples of suitable servers include a SUN workstation, but any server that uses perl (command interpreter) hosted versions for both UNIX and Windows platforms may be used. Clients 106 may comprise any suitable computer for accessing communication means 108. For example, clients 106 may comprise terminals, microcomputers, minicomputers and workstations. In one embodiment, clients 106 may comprise workstations, including Win/PCs, UNIX/Sparc workstations, but any machine that runs a web client (i.e. Netscape) can access the system. Communications means 108 is typically a network. In one embodiment, communications means 108 is a Local-Area Network (LAN) or Wide-Area Network (WAN). In an alternate embodiment, communications means 108 is an intranet. This is the backbone of the system, all capability is deployed over the intranet using web technology. In still another alternate embodiment, communications means 108 is the Internet.

A method and system for issue tracking according to embodiments of the invention reside, for example, within memory 102 of server 100. The system and method of the present invention typically reside on server n so that its inventive features are easily accessible throughout computer system 10 via communications means 108. For example, in the embodiment shown in FIG. 1, memory 102 has a database program 110 and issue tracking system 112 stored within it in a manner so database 110 and issue tracking system 112 are accessible to clients 106. In this configuration, the technical advantages of issue tracking system 112 are available to all authorized users.

Figure 2:
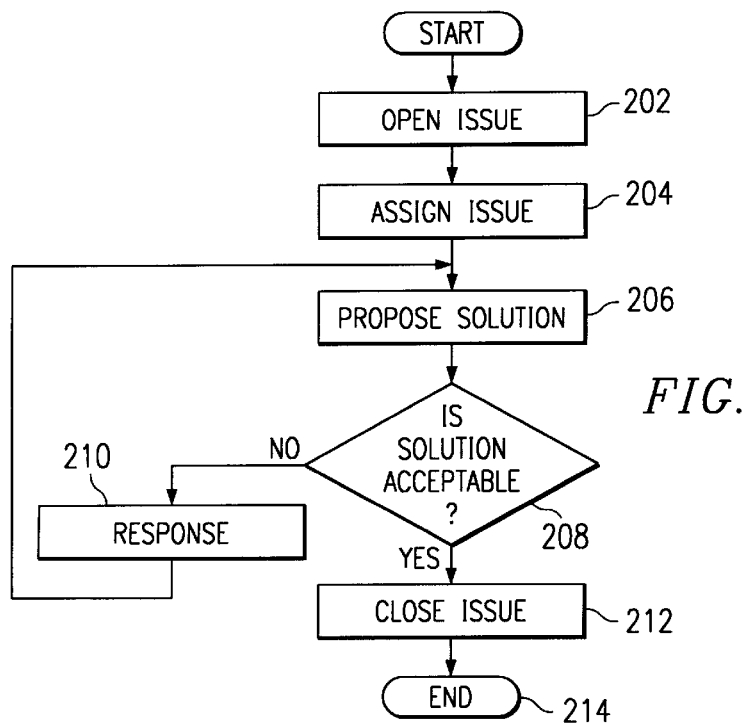
FIG. 2 shows a flowchart of a method for issue tracking according to one embodiment of the invention.

Referring to FIG. 2, a flowchart according to one embodiment of the invention is shown. In the normal course of business, there are many events, for example, meetings, that may give rise to an issue that needs to be addressed. In order to facilitate tracking issues using the teachings of the present invention, in step 202, an issue is opened. Opening an issue comprises entering information that defines the issue. In one embodiment, the information defining the issue is entered into information accepting fields of a graphical user interface (GUI) and comprises originator information, suspense information, an issue description, and a relative priority. In one embodiment, interested party information may also be entered. Interested party information generally comprises a list of all parties who may have an interest in the resolution of an issue and may be specified by including, inter alia, the e-mail addresses of all the interested parties. Other information may be entered as necessary. The issue is generally opened and necessary information entered using one of clients 106.

In step 204, the issue is assigned. According to one embodiment, an issue is assigned at the same time that the issue is opened, for example, by entering identifying information into one of the information accepting fields on the GUI discussed above. Further, an issue can be assigned to either a specific individual or to a group (e.g., a department, a team, etc.). In one embodiment, an issue is initially assigned to a group and then later assigned within the group to a specific party. In another embodiment, an issue is assigned to a specific party when the issue is opened. In still another embodiment, the assignment is optional.

Once the issue is assigned, the assigned party or parties are notified. In a preferred embodiment an electronic mail message is generated and forwarded to the assigned party. The e-mail generally includes a notification that an issue has been assigned to the assigned party and that the assigned party should sign on to the issue tracking system for details of the issue. In one embodiment, the e-mail message also includes one or more of, the issue description, suspense information, and originator information. If an issue was assigned to a group, a predefined responsible party for the group, such as a manager, is sent this e-mail message. The manager of the group is ultimately responsible for the issue.

If the assignment is left blank, the e-mail message is sent to the originator. In this way, the method and system of the present invention are useful as a personal planning tool. In another embodiment, if the issue is not assigned within a predetermined time period, an e-mail reminder is sent to the originator, reminding the originator that the issue has not been assigned. The length of the predetermined time period may depend on the relative priority of the issue, entered with the issue was opened.

According to another embodiment of the invention, the originator and/or the assigned party are periodically reminded of open issues. The time period for these automatic reminders may be fixed, or may be set by the originator. For example, the originator may automatically receive an e-mail every five days if no action is taken on a high priority issue. The frequency and timing of the reminders may be related to the relative priority of the issue. Other techniques for reminding users of issues may also be used. In another embodiment, the assigned party is similarly periodically reminded of the open issue.

If, during the course of resolving an issue, it is determined that the issue was incorrectly assigned or that a new individual should be responsible for the issue, the assigned party in the system may be changed by entering the appropriate information through one of clients 106. In one embodiment, this information may only be changed by the originating party. In another embodiment, certain system users have special status, e.g., management, and are thereby authorized to change the assigned party of any issue. After an issue is opened and assigned, in step 206, a solution to the issue is proposed. In a preferred embodiment, a solution is proposed by either the assigned party or by anyone having access to the issue tracking system and the details of the particular issue. In one embodiment, information related to a proposed solution is entered into information accepting fields of a second GUI using one of clients 106 and automatically e-mailed to the appropriate party. The proposed solution may refer to other files which may be included as attachments to the e-mail. In one embodiment, the appropriate party may be a group of interested parties, if such a group were specified. In another embodiment the information related to the proposed solution is sent only to the originator of the issue. The assigned party has the option of designating additional recipients should that be necessary. In an alternate embodiment, the proposed solution may include a hypertext link to a www page.

In step 208, a determination is made as to whether the proposed solution is acceptable and resolves the issue. In one preferred embodiment, all parties receiving information relating to the proposed solution may respond with their views to the assigned party through electronic mail. In one embodiment, all comments submitted are sent to all interested parties. Further, all comments may be automatically tagged as related to a particular issue and saved in a database. Other techniques for responding and recording the responses may also be used. If the proposed solution is not accepted, control returns to step 206 and an additional proposed solution is created and forwarded as described above.

If the proposed solution is acceptable, the issue is closed in step 212. In a preferred embodiment, when an issue is closed, all information related to that issue is stored in a database for future reference. In one embodiment of the invention, the originator is the only party that can close the issue. In another embodiment, individuals having special status are permitted to close an issue.

Figure 3:
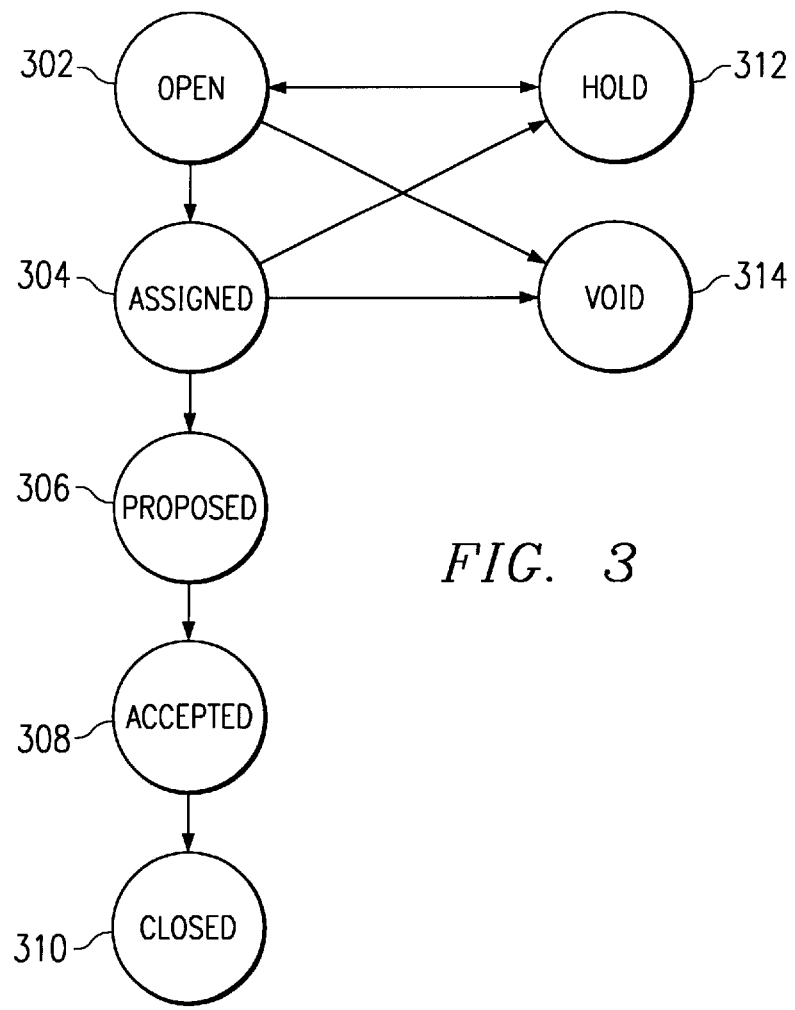
FIG. 3 shows a state diagram of a method for issue tracking according to one embodiment of the invention.

The teachings of the present invention enable issues to follow a logical state transition flow. FIG. 3 shows a state diagram of an issue within an issue tracking system according to one embodiment of the invention. A newly created issue is opened by the originator and exists in the open state 302, and normally progresses to the assigned state 304. In assigned state 304, the issue is assigned to and normally accepted by an assigned party who is to work on the issue. Issues may be declined by an assigned party through reassignment of the issue. After the assigned state, the issue occupies the proposed state 306, where the assigned party proposes a solution to the issue. If the proposed solution is accepted, the issue progresses to the accepted state 308. When a proposed solution has been accepted, the issue moves to the closed state 310. An issue may be closed by the originator, or it may be closed by another party depending upon particular issue. States 302–310 are the primary states that issues will occupy.

There are two secondary states that the issue may also occupy. The hold state 312 is used when the issue is put on hold to be reopened at a later date. For example, the hold state may be used when an issue that pertains to a later development of a project is raised at the projects inception and would be better discussed at a later date. The void state 314 is used when a solution is never implemented for an issue. An issue in the void state is effectively closed. The issue enters each state according to the state diagram of FIG. 3. Issues may not "skip over" states. Issues are normally not put in the hold or void states after solutions are proposed.

Figure 4:
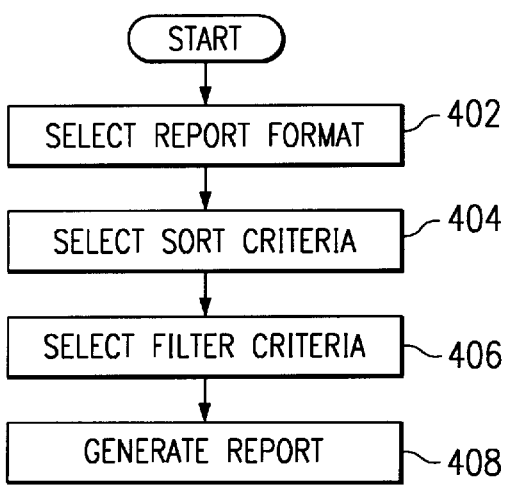
FIG. 4 is a flowchart illustrating the report generating process according to one embodiment of the present invention.

In one embodiment, the method and system of the present invention also generates reports to assist management in assessing efficiency and effectiveness. For example, the method and system of the present invention can generate a metrics report that breaks down issues into categories such as the average age of open issues by priority, etc. FIG. 4 represents a flow chart for the metrics report functions of the system and method according to one embodiment of the invention. In an initial step 402, a user selects a desired report format. There are at least two report formats from which a user may choose. A full report provides a listing of how the report was generated, a summary of each issue, and a hypertext link to allow an issue appearing in the report to be edited. A formal report includes all of the information in the full report, but dispenses with the hypertext links and the description of how the report was generated. The formal report allows reports to be presented, captured in ASCII format, or mailed without extraneous information. Other report formats may also be used.

In step 404 a sort criteria is selected. The sort criteria enable the user to select how issues to be listed in the report are presented. For example, if "age" is selected as the sort criteria, then the issues will be listed from oldest to youngest. If the "owner" is selected as the sort criteria, the issues will be grouped alphabetically by owner. Other sort criteria may also be provided.

In step 406 suitable filter criteria for the report are selected. The filter criteria allow a user to eliminate unwanted issues from the report being generated. Under certain circumstances, a user may select a first filter criteria and a second filter criteria. First filter criteria allows the user to filter in only those issues meeting a certain criteria. For example, if a user wants a report of all issues over 20 days old, the user would select "age" and enter "20" into a corresponding age field. The user may also be able to filter by owner, by assignee, priority, etc. using a similar technique. Second filter criteria is similar to the first filter criteria in both form and function. Nevertheless, a user must select a first filter criteria before a second filter criteria may be chosen. Second filter criteria 408 allows further screening of issues. Continuing with the example above, if the user selected all issues over 20 days old in the first filter criteria, the user can enter an owner identification or priority criteria to further screen the issues found with the first filter criteria. It is important to note that neither first filter criteria nor second filter criteria are required in order generate a report.

Finally, in step 408, a report is generated using the options selected in steps 402–406. This type of report is a useful tool, for example, to assist managers in monitoring all issues assigned to their particular group.

In one preferred embodiment, the system of the present invention provides a GUI to facilitate the process of generating a report. For example, the GUI may include radio buttons to select among the various available report formats and to facilitate choosing among various criteria by which issues can be sorted. The GUI may further include radio buttons and text fields suitable for choosing and entering the various filter criteria.

While the invention has been particularly shown and described by the foregoing detailed description, it will be understood by those skilled in the art that various other changes in form and detail may be made without departing from the spirit and scope of the invention.

What is claimed is:

1. A computer system for facilitating tracking of an issue, comprising:
   a plurality of servers;
   a plurality of clients;
   communications means interconnecting said servers and said clients to form a computer network;
   issue tracking means stored within one of said servers, said issue tracking means including:
      a first graphical user interface (GUI) displayed on a computer display, said first GUI comprising a first plurality of information accepting fields operable to accept information defining the issue from an originator of the issue, wherein said first plurality of information accepting fields includes a field for entering a relative priority for said issue, a field for entering originator information for said issue, a field for entering suspense information for said issue, and a field for entering a textual description of said issue;
      means for notifying an assigned party in response to entry of said information defining the issue;
      a second GUI displayed on the computer display, said second GUI comprising a second plurality of information accepting fields operable to accept information related to a proposed resolution of the issue from the assigned party; and
      means for forwarding said information related to a proposed resolution of the issue to a first group of users of said computer system.

2. The system of claim 1, wherein said means for notifying an assigned party includes:
   means for generating a first message to said assigned party in response to entry of said information defining the issue; and
   means for transmitting said first message to said assigned party via said communications means.

3. The system of claim 1, wherein said first group of users of said computer system includes the originator of the issue.

4. The system of claim 1, wherein said first group of users of said computer system includes the assigned party and the originator of the issue.

5. The system of claim 1, wherein said issue tracking means further includes:
   means for generating a reminder message to the first group of users.

6. The system of claim 1, wherein said second plurality of information accepting fields includes a field for entering a textual description of said proposed solution to said issue.

7. An issue tracking application, comprising:
   a first graphical user interface (GUI) displayed on a computer display, said first GUI including a first plurality of information accepting fields operable to accept information defining the issue from an originator of the issue, wherein said first plurality of information accepting fields includes a field for entering a relative priority for said issue, a field for entering originator information for said issue, a field for entering suspense information for said issue, and a field for entering a textual description of said issue;
   means for notifying an assigned party in response to entry of said information defining the issue;
   a second GUI displayed on the computer display, said second GUI comprising a second plurality of information accepting fields operable to accept information related to a proposed resolution of the issue from the assigned party; and
   means for forwarding said information related to a proposed resolution of the issue to a first group of users of said application.

8. The application of claim 7, wherein said means for notifying an assigned party includes:
   means for generating a first message to said assigned party in response to entry of said information defining the issue; and
   means for transmitting said first message to said assigned party via a computer network.

9. The application of claim 7, wherein said first group of users of said computer system includes the originator of the issue.

10. The application of claim 7, wherein said first group of users of said application includes the assigned party and the originator of the issue.

11. The application of claim 7, wherein said issue tracking means further includes:
    means for generating a reminder message to the first group of users if said issue has not been resolved within a predetermined time period.

12. The application of claim 7, wherein said second plurality of information accepting fields includes a field for entering a textual description of said proposed solution to said issue.

13. The application of claim 7, further comprising:
    means for generating reports.

14. A method for facilitating tracking of an issue, comprising:
    entering information defining an issue to be tracked into a plurality of information accepting fields on a first graphical user interface (GUI), wherein said first plurality of information accepting fields includes a field for entering a relative priority for said issue, a field for entering originator information for said issue, a field for entering suspense information for said issue, and a field for entering a textual description of said issue;

notifying an assigned party in response to entry of said information defining the issue;

entering information related to a proposed resolution of the issue from the assigned party into a plurality of information accepting fields on a second GUI; and, forwarding said information related to a proposed resolution of the issue to a first group of interested individuals.

15. The method of claim 14, further comprising:

entering comments related to said proposed solution to said issue in a plurality of information accepting fields on a third GUI.

16. The method of claim 14, wherein notifying an assigned party includes:

generating a first message to said assigned party in response to entry of said information defining the issue; and transmitting said first message to said assigned party.

17. The method of claim 16, wherein said transmitting step includes sending said first message via electronic mail.

18. The method of claim 14, further comprising generating a reminder message to the first group of interested individuals if said issue has not been resolved within a predetermined time period.

19. The method of claim 14, wherein said first group of interested individuals includes an originator of the issue to be tracked.

20. The method of claim 14, wherein said first group of interested individuals includes an originator of the issue to be tracked and said assigned party.

21. The method of claim 14, wherein said plurality of information accepting fields on the second GUI include a field for entering a textual description of said proposed solution.

22. The method of claim 21, further comprising:

entering said textual description into said information accepting fields on the second GUI via a hypertext link.

23. The method of claim 14, wherein forwarding said information related to a proposed resolution of the issue includes sending an electronic mail to the first group of interested individuals.

24. The method of claim 14, further comprising:

entering information to close said issue, wherein said issue and associated files are stored in a database in response to said entry of information to close said issue.

* * * * *